W. C. P. BALDWIN.
REVERSIBLE AND ADJUSTABLE GARMENT.
APPLICATION FILED MAY 11, 1911.
1,038,821.
Patented Sept. 17, 1912.
3 SHEETS—SHEET 1.
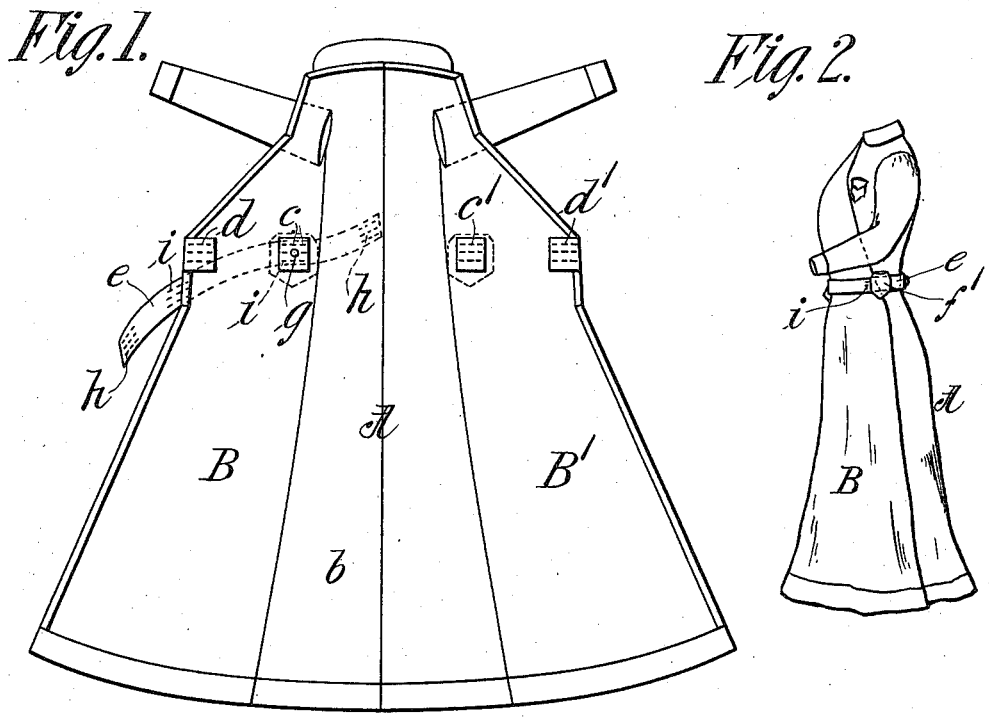
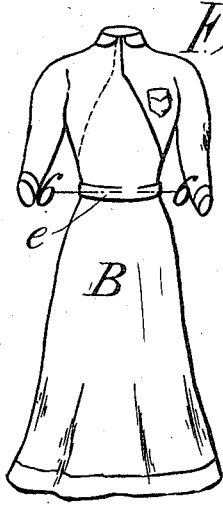
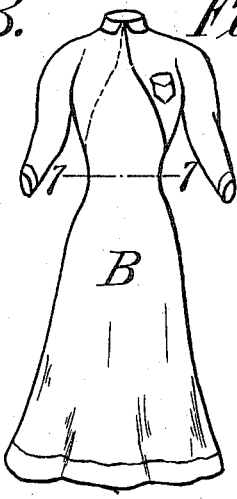
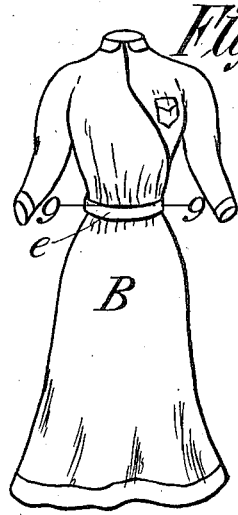
WITNESSES:
INVENTOR,
Wm. C. P. Baldwin,
BY
ATTORNEY.

W. C. P. BALDWIN.
REVERSIBLE AND ADJUSTABLE GARMENT.
APPLICATION FILED MAY 11, 1911.

1,038,821.

Patented Sept. 17, 1912.

3 SHEETS—SHEET 2.

WITNESSES:
H. L. Sprague
R. M. Mowry

INVENTOR,
Wm. C. P. Baldwin,
BY
ATTORNEY.

W. C. P. BALDWIN.
REVERSIBLE AND ADJUSTABLE GARMENT.
APPLICATION FILED MAY 11, 1911.

1,038,821.

Patented Sept. 17, 1912.

3 SHEETS—SHEET 3.

WITNESSES:
H. L. Sprague
R. M. Mowry

INVENTOR,
Wm. C. P. Baldwin,
BY
ATTORNEY.

UNITED STATES PATENT OFFICE.

WILLIAM C. P. BALDWIN, OF HOLYOKE, MASSACHUSETTS, ASSIGNOR TO BALDWIN GARMENT COMPANY, OF HOLYOKE, MASSACHUSETTS, A CORPORATION OF MASSACHUSETTS.

REVERSIBLE AND ADJUSTABLE GARMENT.

1,038,821.  Specification of Letters Patent.  Patented Sept. 17, 1912.

Application filed May 11, 1911. Serial No. 626,603.

*To all whom it may concern:*

Be it known that I, WILLIAM C. P. BALDWIN, a citizen of the United States of America, and resident of Holyoke, in the county of Hampden and State of Massachusetts, have invented certain new and useful Improvements in Reversible and Adjustable Garments, of which the following is a full, clear, and exact description.

This invention relates to an improved one piece garment which is made up in the form of a robe or dress and comprises a waist and skirt divided at the front and made so that the front portions thereof are reversible and of a similar general character to that described and shown in Letters Patent of the United States granted to me April 7, 1908, No. 884,063.

The object of the present invention is to make a garment having double and reversible apron portions so that it may have the appearance, when worn, of a waist and skirt, with a belt; or a "Princess" dress, without the belt being visible, at the option of the wearer, and so that it may have varying appearances as suits the wearer.

A further object is to provide peculiarly arranged means for altering the girth and waist line of the garment, and to make provisions whereby such means may be invisible and also easily manipulated.

Another object is to make the garment so that when it is to be laundried it will not have thereon any buttons, studs or like fastenings. And other objects are, generally to improve, and add to the desirability and attractiveness of the apparel.

The invention is hereinafter fully described in conjunction with the accompanying drawings, and set forth in the claims.

Figure 6:
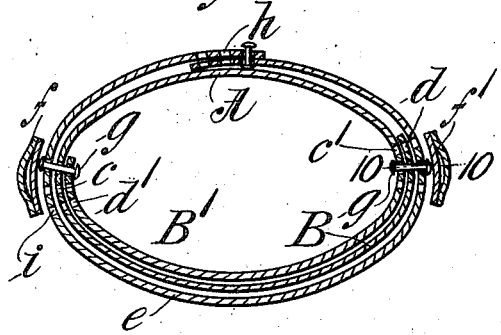
Figure 7:
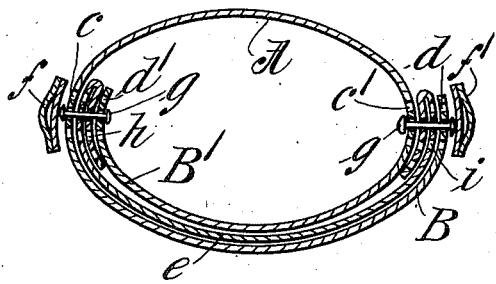
Figure 8:
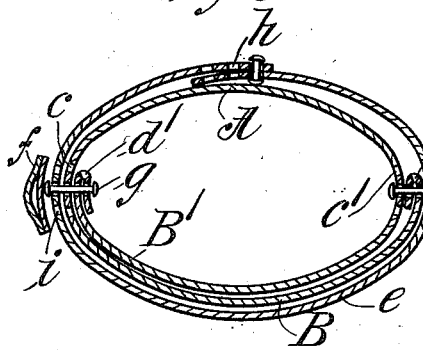
Figure 9:
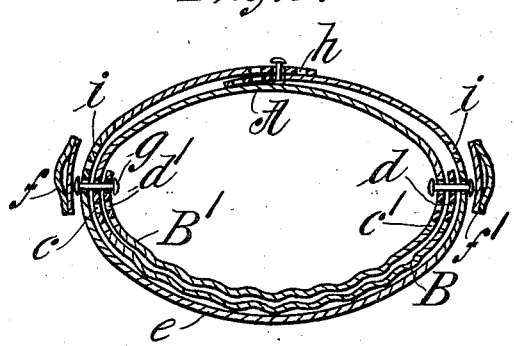
Figure 10:
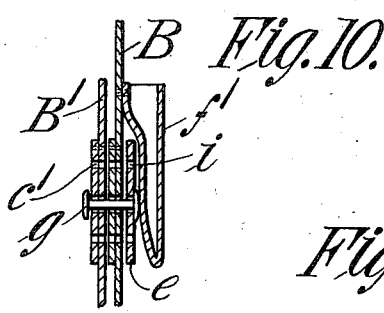
Figure 11:
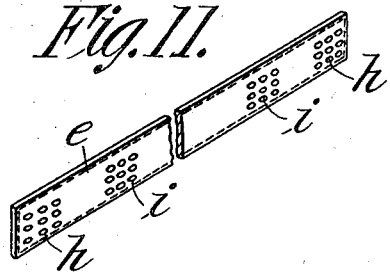
Figure 12:
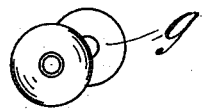
Figure 13:
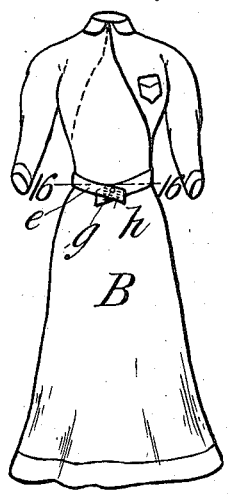
Figure 15:
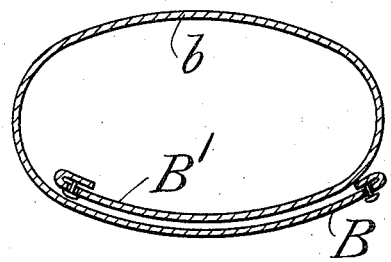
Figure 14:
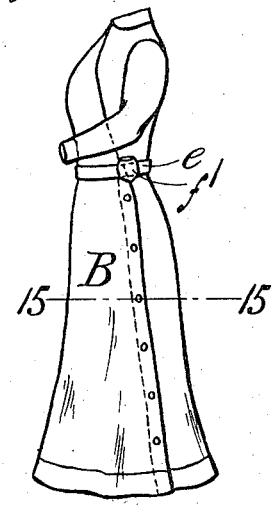
Figure 16:
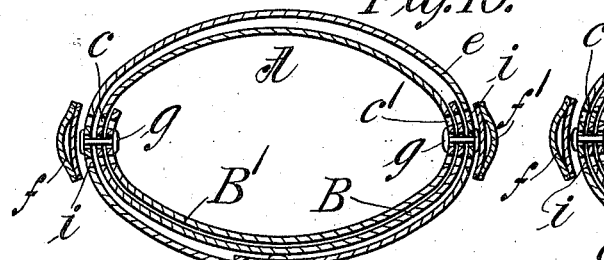
Figure 17:
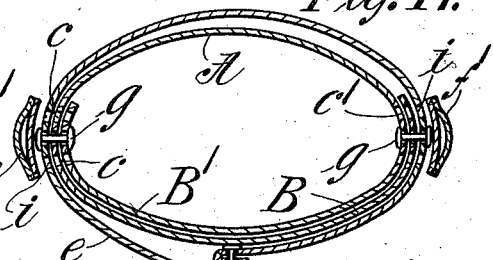
Figure 18:
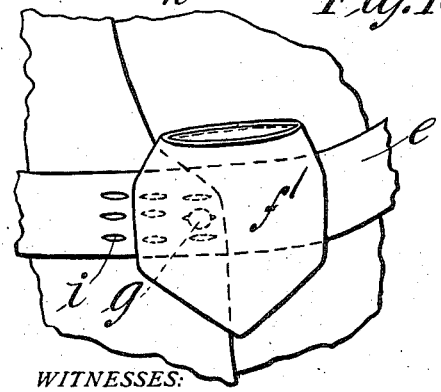
Figure 19:
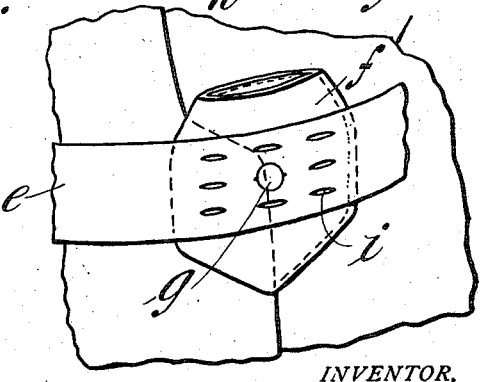

In the drawings:—Figure 1 shows the improved one-piece garment in its spread out condition. Fig. 2 is a side view of the garment as worn, the belt being utilized and visible. Figs. 3, 4 and 5 are front views of the garment showing various ways in which it may be worn. Fig. 6 is a cross section taken on line 6—6, Fig. 3. Fig. 7 is a cross section taken on the line 7—7, Fig. 4. Fig. 8 is a section similar to Fig. 6 but showing a smaller girth of the garment and the means of acquiring it. Fig. 9 is a cross-section taken on the line 9—9, Fig. 5, wherein the "bloused" garment is represented. Fig. 10 is a partial vertical section taken on the line 10—10, Fig. 6. Fig. 11 is a perspective view of the belt showing it as provided with its series of buttonholes. Fig. 12 is a perspective view of the stud or button such as used in conjunction with the garment. Fig. 13 is a front view of the garment as worn showing a somewhat different adjustment of the belt. Fig. 14 is a side view of the garment showing additional features. Fig. 15 is a cross section taken on the line 15—15, Fig. 14. Figs. 16 and 17 are cross-sections taken on the line 16—16, Fig. 13 and showing different methods of varying the girth of the garment and wearing the belt. Figs. 18 and 19 show appliances for concealing the garment adjusting and confining means.

In the drawings, A represents the back of the garment, the lower portion *b* of which constitutes a skirt of usual or proper length. B and B' represent side portions which are continuous with the back and its skirt to form the apron members or reversible portions so that one may overslip the other at the front and extend to the sides of the person as indicated in Figs. 2, 3, 4, 5, 13 and 14.

The garment has a plurality of inner button-holes at *c* and *c'*, at the waist line, and approximately where what may be regarded as the apron members merge into the back, and at the edge of the apron members at the waist line are also the groups of outer button holes as *d* and *d'*. Each of the groups, as here shown, comprise nine buttonholes arranged in three rows, one above the other, each row including three holes.

Over the buttonholes *c* and *c'* are appliances which may be simple flaps, although here they are shown as pockets at *f* and *f'*, in Figs. 2, 14, 18 and 19. the top portions of which are secured to the garment and the pocket or flap is free to be folded back away from the buttonholes *c* and *c'* when adjustment of the garment is necessary. After the wearer has determined which set of buttonholes to use, the flap may be sewed permanently in place so that she may use the same buttonhole every time the garment is worn.

A belt *e* is provided having buttonholes *h* at its ends and also buttonholes *i* at two intermediate portions thereof. The belt may have single rows of three button holes at the various portions of its length, or, if desired, but not generally necessary or desirable, it may have multiple rows of the button holes as shown in Fig. 11.

No buttons or metallic fasteners are secured to the garment permanently, and only detachable buttons or studs $g$ of any appropriate construction, such, for instance as are shown in Fig. 12 are used, and these may be easily inserted in the button holes and removed when the garment is to be laundried.

From the foregoing description, and on reference to Figs. 5, 6 and 8, it will be apparent that by the employment of the large number or multiple series of button-holes in the garment the waist line and girth of the garment may be changed as desired without permanent alteration thereof.

When the garment is to be worn, the apron member B is lapped over the similar apron member B' which is secured to a stud $g$ engaging in the proper button-hole at $c$. The overlapping member B is then secured to a stud or double button $g$ in the proper button-hole as at $c'$. The waist line of the garment may be raised or lowered by placing the studs or buttons $g$ in a higher or lower button-hole as the case may be, and to change the girth or waist measure of the garment, the studs may be moved inwardly or outwardly from one button-hole to the next in the same row of holes until the proper measure is obtained. A scope of several inches is generally allowed for adjustment.

If it is desired to produce a blouse effect the waist measure on the garment itself may be left large and the proper adjustment secured by means of the belt as is shown in Fig. 9.

The garment may be converted into a so-called "Princess" type of dress by removing the belt entirely therefrom, or if desired the belt may be allowed to remain on the garment by folding the ends thereof back and securing the buttonholes in the ends to the studs in the button holes at $c$ and $c'$, when by reversing the order of the overlapping apron members the belt will be entirely concealed beneath the outermost apron member, as indicated or shown in Figs. 4 and 7.

When the apron member B becomes soiled it may have a reversed arrangement with respect to the other apron member B', so that the latter is presented outermost for a fresh and clean appearance.

The belt, having a plurality of button-holes is capable of much variance in waist measure and fits perfectly at any condition of the garment.

Since all the studs may be removed and the garment is of such simple construction the laundrying thereof is easily accomplished.

I claim:—

1. A single piece waist and skirt garment having overlapping apron sections which extend across the front of the body of the wearer with their edges terminating at the sides, there being outer button holes adjacent the edges of the apron sections and inner button holes at the sides of the garment, the inner and outer holes being arranged at the waistline and spaced at approximately equal distances apart, and a fastener arranged in one inner hole and to the inner end of which the underlapped apron section is buttoned, and a fastener in the other inner hole and to the outer end of which the overlapped apron section is buttoned whereby the apron sections may be reversed.

2. A single-piece waist and skirt garment having reversible overlapping apron sections, there being at the waistline inner and outer groups of button holes spaced at equal distances apart, the outer groups of holes being adjacent the edges of the apron sections and the inner groups being located at the sides of the garment to register with the holes in the apron sections, the holes of each group being arranged in horizontal and vertical rows, fasteners engaged in appropriate holes of the registering groups whereby the waistline and the girth can be adjusted to suit the form of the wearer, and a belt capable of being worn around the outside of the garment and attached to the outer ends of the fasteners or capable of being worn between the overlapping apron sections and held by the fasteners whereby the style of the garment can be changed.

Signed by me at Springfield, Mass., in presence of two subscribing witnesses.

WILLIAM C. P. BALDWIN.

Witnesses:
G. R. DRISCOLL,
W. A. STANNARD.